United States Patent
Bos et al.

(10) Patent No.: US 10,341,098 B2
(45) Date of Patent: Jul. 2, 2019

(54) METHOD OF GENERATING CRYPTOGRAPHIC KEY PAIRS

(71) Applicant: NXP B.V., Eindhoven (NL)

(72) Inventors: Joppe Willem Bos, Wijgmaal (BE); Bjorn Fay, Hamburg (DE); Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 264 days.

(21) Appl. No.: 15/414,391

(22) Filed: Jan. 24, 2017

(65) Prior Publication Data

US 2018/0212767 A1    Jul. 26, 2018

(51) Int. Cl.
  *H04L 9/08* (2006.01)
  *H04L 9/06* (2006.01)
  *H04L 9/30* (2006.01)
  *H04L 9/32* (2006.01)
  *H04L 9/14* (2006.01)

(52) U.S. Cl.
  CPC .......... *H04L 9/0861* (2013.01); *H04L 9/0662* (2013.01); *H04L 9/0825* (2013.01); *H04L 9/0869* (2013.01); *H04L 9/14* (2013.01); *H04L 9/3013* (2013.01); *H04L 9/3066* (2013.01); *H04L 9/3252* (2013.01)

(58) Field of Classification Search
  CPC ... H04L 9/0861; H04L 9/0662; H04L 9/0825; H04L 9/0869; H04L 9/14; H04L 9/3013; H04L 9/3066; H04L 9/3252
  USPC .......................................................... 380/45
  See application file for complete search history.

(56) References Cited

U.S. PATENT DOCUMENTS

| | | | |
|---|---|---|---|
| 5,271,061 A | * | 12/1993 | Crandall ................. G06F 7/725 380/28 |
| 5,946,397 A | | 8/1999 | M'Raihi et al. |
| 6,091,819 A | | 7/2000 | Venkatesan et al. |

(Continued)

OTHER PUBLICATIONS

Nabil, Ghanmy et al; "Hardware Implementation of Elliptic Curve Digital Signature Algorithm (ECDSA) on Koblitz Curves"; IEEE International Symposium on Communiation Systems, Networks & Digital Signal Processing; pp. 1-6 (Jul. 18, 2012).

(Continued)

*Primary Examiner* — Shahriar Zarrineh
(74) *Attorney, Agent, or Firm* — Daniel D. Hill

(57) ABSTRACT

A method is provided for performing elliptic curve cryptography that reduces the number of required computations to produce, for example, a key pair. The number of computations is reduced by changing how a random nonce used in the computations is selected. In an embodiment, a look-up table is generated having pre-computed scalar values and elliptic curve points. Every time a new pseudo-random value is created for use in the ECDSA, a combination of the look-up table values is used to create multiple intermediate values. One of the multiple intermediate values is randomly chosen as a replacement value for one of the existing table entries. Each time the look-up table is used, multiple entries in the look-up table are updated to new look-up table values as described. In this manner, new randomness is provided in every step to generate the next pseudo-random nonce as a combination of multiple internally stored temporary look-up table values. Alternately, another mathematical group may be used.

16 Claims, 3 Drawing Sheets

(56) References Cited

U.S. PATENT DOCUMENTS

| | | | | |
|---|---|---|---|---|
| 7,356,688 B1* | 4/2008 | Wang | H04L 9/3013 | 380/277 |
| 7,720,225 B2* | 5/2010 | Gebotys | H04L 9/003 | 380/252 |
| 8,229,114 B2* | 7/2012 | Nan | H04L 9/3073 | 380/277 |
| 8,532,289 B2* | 9/2013 | Gentry | H04L 9/008 | 380/44 |
| 9,356,779 B2* | 5/2016 | Boneh | H04L 9/0847 | |
| 9,497,029 B2* | 11/2016 | Kirillov | H04L 9/003 | |
| 9,654,288 B1* | 5/2017 | Howell | H04L 9/0861 | |
| 9,800,411 B1* | 10/2017 | Brown | H04L 9/3066 | |
| 2002/0095583 A1* | 7/2002 | Vanstone | G06Q 20/341 | 713/180 |
| 2003/0235299 A1* | 12/2003 | Dupaquis | G06F 7/72 | 380/30 |
| 2004/0076291 A1* | 4/2004 | Geiringer | H04L 9/3093 | 380/28 |
| 2004/0131191 A1* | 7/2004 | Chen | H04L 9/3013 | 380/282 |
| 2004/0223616 A1* | 11/2004 | Kocarev | H04L 9/001 | 380/263 |
| 2006/0143238 A1* | 6/2006 | Tamatsu | G06F 17/30336 | |
| 2006/0215837 A1* | 9/2006 | Chen | H04L 9/0847 | 380/44 |
| 2007/0165847 A1* | 7/2007 | Langin-Hooper | H04L 9/0668 | 380/46 |
| 2007/0177721 A1* | 8/2007 | Itoh | G06F 7/723 | 380/28 |
| 2007/0248224 A1* | 10/2007 | Buskey | H04L 9/3066 | 380/30 |
| 2008/0072055 A1* | 3/2008 | Volkovs | H04L 9/3013 | 713/180 |
| 2009/0024852 A1* | 1/2009 | Yonezawa | H04L 9/3013 | 713/180 |
| 2009/0100267 A1* | 4/2009 | Brown | H04L 9/3066 | 713/176 |
| 2009/0167489 A1* | 7/2009 | Nan | H04L 9/3013 | 340/5.8 |
| 2011/0185177 A1* | 7/2011 | Spalka | H04L 9/302 | 713/171 |
| 2011/0194694 A1* | 8/2011 | Struik | H04L 9/3252 | 380/255 |
| 2011/0291803 A1* | 12/2011 | Bajic | G08B 13/2462 | 340/10.1 |
| 2012/0331287 A1* | 12/2012 | Bowman | H04L 9/3273 | 713/156 |
| 2013/0039486 A1* | 2/2013 | Itoh | H04L 9/3066 | 380/28 |
| 2013/0287209 A1* | 10/2013 | Itoh | H04L 9/003 | 380/44 |
| 2014/0016772 A1* | 1/2014 | Yajima | H04L 9/003 | 380/28 |
| 2014/0201535 A1* | 7/2014 | Little | H04L 9/3066 | 713/180 |
| 2015/0188713 A1* | 7/2015 | Rombouts | H04L 9/3252 | 380/28 |
| 2016/0019396 A1* | 1/2016 | Davis | G06F 21/6209 | 713/193 |
| 2016/0028538 A1* | 1/2016 | Yoon | H04L 9/0631 | 380/44 |
| 2016/0127123 A1* | 5/2016 | Johnson | H04L 9/003 | 713/189 |
| 2016/0191252 A1* | 6/2016 | Li | H04L 9/3066 | 380/28 |
| 2016/0306750 A1* | 10/2016 | Tucker | G06F 12/1408 | |
| 2016/0344557 A1* | 11/2016 | Chabanne | H04L 9/3066 | |
| 2016/0352525 A1* | 12/2016 | Antipa | H04L 9/3252 | |
| 2017/0230172 A1* | 8/2017 | Andersson | H04L 9/0841 | |
| 2017/0324554 A1* | 11/2017 | Tomlinson | H04L 9/0618 | |

OTHER PUBLICATIONS

Koblitz, Neal, "Elliptic Curve Cryptosystems", Mathematics of Computation, vol. 48, No. 177, Jan. 1987, pp. 203-209.

Miller, Victor S., "Use of Elliptic Curves in Cryptography", Advances in Cryptology—CRYPTO '85, Lecture Notes in Computer Science (LNCS), vol. 218, 1986, pp. 417-426.

FIPS PUB 186-4, Federal Information Processing Standards Publication—Digital Signature Standard (DSS), Information Technology Laboratory, National Institute of Standards and Technology, Jul. 2013, 130 pages.

* cited by examiner

METHOD OF GENERATING CRYPTOGRAPHIC KEY PAIRS

BACKGROUND

Field

This disclosure relates generally to cryptography and more specifically to a method of generating cryptographic key pairs.

Related Art

Generating digital signatures is one of the foundations of modern security infrastructure. One standardized and popular approach is based on the algebraic structure of elliptic curves over finite fields. One of the key features of elliptic curve cryptography (ECC) is the use of significantly smaller key-sizes as compared to, for instance, asymmetric cryptographic systems based on the RSA (Rivest-Shamir-Adleman) algorithm, for the same level of security.

In elliptic curve cryptography, let $F_p$ denote a finite field of prime cardinality p>3. Any a, b∈$F_p$ with $4a^3+27b^2 \neq 0$ define an elliptic curve $E_{a,b}$ over $F_p$. The group of points $E_{a,b}(F_p)$ of $E_{a,b}$ over $F_p$ is defined as the zero point co along with the set of pairs (x, y)∈$F_p \times F_p$ that satisfy the short Weierstrass equation $y^2=x^3+ax+b$. A method for computing digital signatures using the additive structure of elliptic curves is shown below. This is the elliptic curve variant of the Digital Signature Standard (DSS) algorithm as standardized by the National Institute of Standards and Technology (see e.g. FIPS Pub 186-4).

Given a cryptographic hash function H and a message m∈Z compute a digital signature using the elliptic curve digital signature algorithm (ECDSA). The algorithm steps below show the ECDSA and uses a public point P∈E($F_p$) of order n∈Z, and a private key d∈Z/nZ. The algorithm outputs a digital signature (r, s) at line 11.

```
1: function ECDSA_sign((m, d, {P, n}))
2:   Compute e = H(m)
3:   repeat
4:     repeat
5:       Select u ∈R [1,n - 1]
6:       Compute uP =(x, y)
7:       Compute r = x mod n
8:     until r ≠ 0
9:     Compute s = u⁻¹(e + dr) mod n
10:  until s ≠ 0
11:  return (r, s)
```

Signing a message using the ECDSA requires an elliptic curve scalar multiplication (where the output is an ephemeral public key) with a randomly sampled nonce. The modular exponentiation in the ephemeral key computation (line 6 above) may be a computational bottleneck in the algorithm. That is, this is a computationally expensive operation in systems providing modern security levels, and requires computations on the order of hundreds of group operations (point additions or point doublings) which has a significant impact on the signature generation rate. Therefore, a need exists for a method to reduce the number of computations and remove the computational bottleneck to generate a digital signature.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
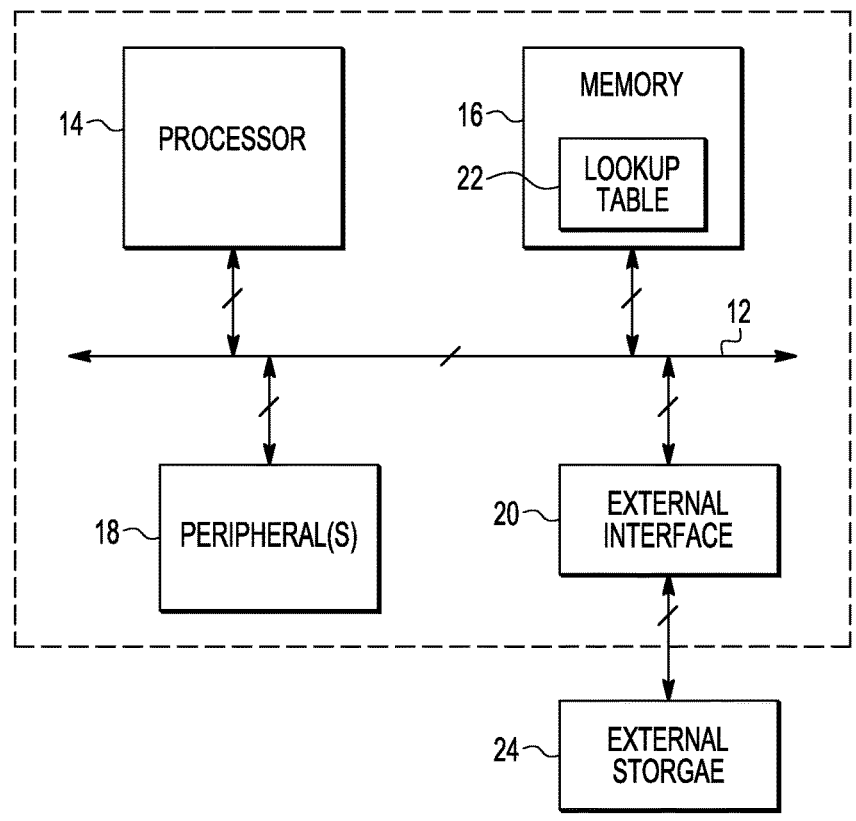
FIG. 1 illustrates, in block diagram form, a data processing system in accordance with an embodiment.

Generally, there is provided, a method for performing elliptic curve cryptography that reduces the number of required computations to produce, for example, a key pair or a digital signature. The number of computations is reduced by changing how the random nonce is selected. In the herein described method, a look-up table is generated having pre-computed scalar values and elliptic curve points. In one embodiment, every time a new pseudo-random value is created for use in the ECDSA, the look-up table is updated. In one embodiment, each time the look-up table is used, a combination of the look-up table values is used to create new table entries. Multiple entries in the look-up table may be updated to new look-up table values. In a general sense, the updating is done by pseudo-randomly walking through the elements of Z/nZ when selecting the scalars u (the private key) and using the isomorphic relationship between Z/nZ and (G) (the group generated by the point G) to quickly determine the associated value uP. New randomness is provided in every step to more e□ciently generate the next random or pseudo-random nonce as a combination of multiple internally stored temporary look-up table values.

In accordance with an embodiment, there is provided, a method for generating cryptographic key pairs in public key cryptography, the method comprising: randomly generating a table having a plurality of table entries, each table entry comprising a plurality of group elements, each group element in a table entry of the plurality of table entries having a same discrete logarithm to a corresponding base, the corresponding bases of the discrete logarithms being the same for each table entry; randomly selecting table entries from the plurality of table entries; computing intermediate table entries from combinations of the selected table entries, each intermediate group element in an intermediate table entry having a same discrete logarithm to a corresponding base, and the corresponding bases of the discrete logarithms of the intermediate group elements being the same as for the table entries; replacing the selected table entries with randomly selected intermediate table entries; and randomly selecting a table entry and providing it as a cryptographic key pair. The public key cryptography may be implemented using an elliptic curve. Computing intermediate table entries from combinations of the selected table entries may further comprise using addition and subtraction operations for the computation of the intermediate table entries. Computing intermediate table entries from combinations of the selected table entries may further comprise using computations of sums and differences of points in a single operation. The method may further comprise providing shared secrets having a same discrete logarithm as the generated cryptographic key pair. Randomly selecting table entries from the plurality of table entries may further comprise storing latest selections of table entries and avoiding repeating the latest selections. The method may further comprise: randomly selecting table entries from the updated table, computing intermediate table entries from combinations of the selected table entries from the updated table, each intermediate table entry of the updated table comprising intermediate group elements, each intermediate group element in an intermediate table entry having a same discrete logarithm to a corresponding base and the corresponding bases of the discrete logarithms being the same as for the table entries from the updated table; and replacing the selected table entries from the updated table with randomly selected intermediate table entries, wherein the steps of randomly selecting, computing, and replacing are repeated several times before providing the key pair. The method may further comprise generating a batch of cryptographic key pairs using the method. The method for generating cryptographic key pairs in public key cryptography may further comprise using simultaneous inversions of Z-components for point-coordinate transformations. The method may further comprise providing a batch of the inverses of the private keys using simultaneous inversions on a batch of private keys.

In another embodiment, there is provided, a non-transitory machine-readable medium having instructions for generating cryptographic key pairs in public key cryptography, the non-transitory machine-readable medium comprising: instructions for randomly generating a table having a plurality of table entries, each table entry comprising a plurality of group elements, each group element in a table entry of the plurality of table entries having a same discrete logarithm to a corresponding base, the corresponding bases of the discrete logarithms being the same for each table entry; instructions for randomly selecting table entries from the plurality of table entries; instructions for computing intermediate table entries from combinations of the selected table entries, each intermediate group element in an intermediate table entry having a same discrete logarithm to a corresponding base, and the corresponding bases of the discrete logarithms of the intermediate group elements being the same as for the table entries; instructions for replacing the selected table entries with randomly selected intermediate table entries; and instructions for randomly selecting a table entry and providing it as a cryptographic key pair. The public key cryptography may be implemented using an elliptic curve. The instructions for computing intermediate table entries from combinations of the selected table entries may further comprise instructions using addition and subtraction operations for the computation of the intermediate table entries. The instructions for computing intermediate table entries from combinations of the selected table entries may further comprise instructions for using computations of sums and differences of points in a single operation. The non-transitory machine-readable medium may further comprise instructions for providing shared secrets having a same discrete logarithm as the generated cryptographic key pair. The instructions for randomly selecting table entries from the plurality of table entries may further comprise instructions for storing latest selections of table entries and avoiding repeating the latest selections. The non-transitory machine-readable medium may further comprise: instructions for randomly selecting table entries from the updated table; instructions for computing intermediate table entries from combinations of the selected table entries from the updated table, each intermediate table entry of the updated table comprising intermediate group elements, each intermediate group element in an intermediate table entry having a same discrete logarithm to a corresponding base and the corresponding bases of the discrete logarithms being the same as for the table entries from the updated table; and instructions for replacing the selected table entries from the updated table with randomly selected intermediate table entries. The non-transitory machine-readable medium may further comprise instructions for generating a batch of cryptographic key pairs. The non-transitory machine-readable medium may further comprise instructions for using simultaneous inversions of Z-components for point-coordinate transformations. The instructions for providing inverses of the private keys may further comprise instructions for providing a batch of the inverses of the private keys using simultaneous inversions on a batch of private keys.

In one embodiment, a method of performing elliptic curve cryptography is implemented using software running on a data processing system. FIG. 1 illustrates a simplified block diagram of integrated circuit data processing system 10 in accordance with an embodiment suitable for performing elliptic curve cryptography. Data processing system 10 may be a system-on-a-chip (SoC) implemented on a single integrated circuit, or it may be a combination of chips. In other embodiments, integrated circuit 10 may include another type of circuit such as an ASIC (application specific integrated circuit), FPGA (field programmable gate array), or the like, that can provide execute instructions. In one embodiment, data processing system 10 may include metal-oxide semiconductor (MOS) transistors fabricated using a conventional complementary metal-oxide semiconductor (CMOS) process. In another embodiment, data processing system 10 may include other transistor types, such as bipolar, and may be manufactured with a different process.

Data processing system 10 includes communication bus 12, processor 14, memory 16, peripherals 18, and external interface 20. Bus 12 may be a conventional bus having a plurality of conductors for communicating address, data, and control information. In other embodiments, bus 12 may be an interconnect structure such as for example, a cross-bar switch or other form of interconnect system. Processor 14 is bi-directionally connected to bus 12. Processor 14 may include one or more of any type of processing element, a processor core, microprocessor, microcontroller, digital signal processor, and the like. There can be any number of processors. Memory 16 is bi-directionally connected to bus 12. Memory 16 can be one or more of any type of volatile or non-volatile memory. A portion of memory 16 is used as a look-up table (LUT) 22. Look-up table 22 may be one contiguous LUT in one memory, or LUT 22 may be distributed between different physical memories. In another embodiment, LUT22 may comprises multiple look-up tables. Examples of memory types include non-volatile memories such as flash, one-time programmable (OTP), EEPROM (electrically eraseable programmable read only memory), and the like. Volatile memory types include static random access memory (SRAM) and dynamic random access memory (DRAM). The memory may be used for storing instructions and/or data. Peripheral(s) 18 is bi-directionally connected to bus 12 and can be one or more of any type of peripheral or application module depending on the application. For example, peripheral(s) 18 may include a coprocessor optimized for running encryption/decryption security software according to the digital signature algorithm standard for elliptic curve cryptography. Elliptic curve cryptography may be used to encrypt/decrypt data and instructions in data processing system 10. Other types of peripheral(s) may be provided for processing video, audio, error diagnostics, power management, etc. External interface 20 is bi-directionally connected to bus 12 for interfacing external components to bus 12. In the illustrated embodiment, external interface 20 is bi-directionally connected to external storage 24. External storage 24 may be any type of non-transitory machine-readable storage medium, such as for example, magnetic disk storage medium and optical storage medium. External storage 24 may be provided for storing instructions in accordance with an embodiment of the present disclosure.

Figure 2:
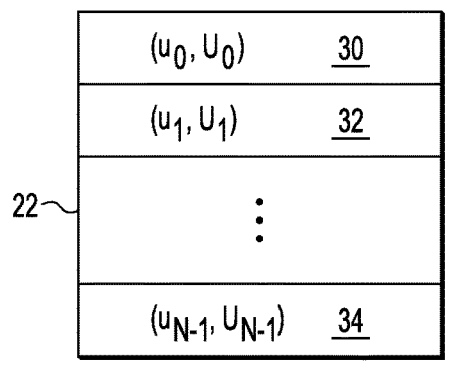
FIG. 2 illustrates a look-up table in accordance with an embodiment.

FIG. 2 illustrates look-up table 22 of FIG. 1 in accordance with an embodiment. Look-up table 22 includes a plurality of look-up table entries ($u_0$, $U_0$) to ($u_{N-1}$, $U_{N-1}$), represented by look-up table entries 30, 32, and 34. The plurality of look-up table entries may be precomputed and stored in a memory such as memory 16 in FIG. 1. In the illustrated embodiment, each entry is a tuple comprising a scalar value u and an elliptic curve point U. A tuple is a finite ordered list of elements. In mathematics, an n-tuple is a sequence (or ordered list on n elements, where n is a non-negative integer (here n is not an order).

In the method, N is a positive integer, which determines how many scalars and points are pre-computed and stored in LUT 22. The letter v is a positive integer less than N representing the number of points used in the computation of a key pair used to generate, for example, the digital signature. In the pre-computation phase the N precomputed elliptic curve points $U_i \in E(F_p)$ for $0 \leq i < N$ and scalars are computed as $$U_i = u_i \times G$$

where N values $u_i$ are selected uniformly at random from [1, N-1]. The elliptic curve points $U_i$ and scalar values $u_i$ are stored and used during the process of generating the key pairs that can then be used, for example, to generate signatures.

Next the algorithm is executed as illustrated below. The idea behind this algorithm is as follows: Output pairs (u, U) (where U=u×G) are generated in batches. For each output pair use v+1 of the internally stored elements to compute the output. The way these elements are combined (either addition or subtraction) is decided at random. Moreover, look-up table 22 is updated at every step of the algorithm. The location that is updated is also decided at random.

Four elliptic curve points are computed:

$$\pm U_{i_0} \pm U_{i_k}, \text{ where } 0 < k \leq v \text{ or } k = -1$$

and two of these values are randomly selected and used to replace $U_{i[0]}$ and $U_{i[k]}$ (also randomly chosen). This process is repeated v times where v was defined above to be a positive integer representing the number of points used in the computation of the digital signature.

In one embodiment, the number of computations can be held to a minimum because four intermediate values $$U_{i[0]} + U_{i[k]}$$

$$U_{i[0]} - U_{i[k]}$$

$$-U_{i[0]} + U_{i[k]}$$

$$-U_{i[0]} - U_{i[k]}$$

can be computed at a computation cost of slightly more than one elliptic curve point addition by re-using intermediate results.

The global parameters M, N, v, the generator $G \in E(F_p)$ and the N pre-computed scalars $u_i$ and elliptic curve points $U_i = u_i \times G$ for $0 \leq i < N$ are used to compute M pseudo-random points $B_j$ and scalar b such that $B_j = b_j \times G$ for $0 \leq j < M$. The variable k is the iterator for the herein described algorithm that selects which index i[k] is used to select a look-up table entry. The following is an example algorithm for updating look-up table 22 in accordance with an embodiment where the initial starting conditions are:

$$F \leftarrow \{1, 2, \ldots, N\} \text{ and}$$

$$i[-1] \leftarrow 0$$

for each batch proceed as follows:

```
for j = 0, ..., M-1 do
    C ← {0, 1, ..., N - 1} \ { i[-1] }
    if F = { } then        // still set from the last batch
        F ← {0, 1, 2, ..., N - 1} \ { i[-1] }
    i[0] ← random element of F
    F ← F \ { i[0] }
    C ← C \ { i[0] }
    for k = 1, ..., v-1 do
        i[k] ← random element of C
        C ← C \ { i[k] }
        F ← F \ { i[k] }
    randomUpdate( i[-1], i[0] )      // see below
    for k = 1, ..., v-1 do
        randomUpdate( i[0], i[k] )   // see below
    b_j ← u_{i[0]}
    B_j ← U_{i[0]}
    i[-1] ← i[0]
```

SubMethod random Update(x, y):

$$(u_x, u_y) \leftarrow (u_x + u_y, u_x - u_y)$$

$$(U_x, U_y) \leftarrow (U_x + U_y, U_x - U_y)$$

if random(0, 1)=1 then $$(u_x, U_x) \leftrightarrow (u_y, U_y)$$

if random(0, 1)=1 then $$(u_x, U_x) \leftarrow (-u_x, -U_x)$$

if random(0, 1)=1 then $$(u_y, U_y) \leftarrow (-u_y, -U_y)$$

The points are usually computed using projective coordinates with X-, Y- and Z-components. To transform them back to affine coordinates with only X- and Y-components, the main effort is to invert the Z-component. To speed up the transformation back to affine coordinates, the complete output of a batch can be transformed at once using simultaneous inversions of the Z-components at the cost of slightly more than one inversion. This can be done by inverting the product of the values and to invert and multiply the resulting product with the original values. Similarly, the private keys may also be inverted for the complete batch as preparation for being used in the ECDSA algorithm.

Figure 3:
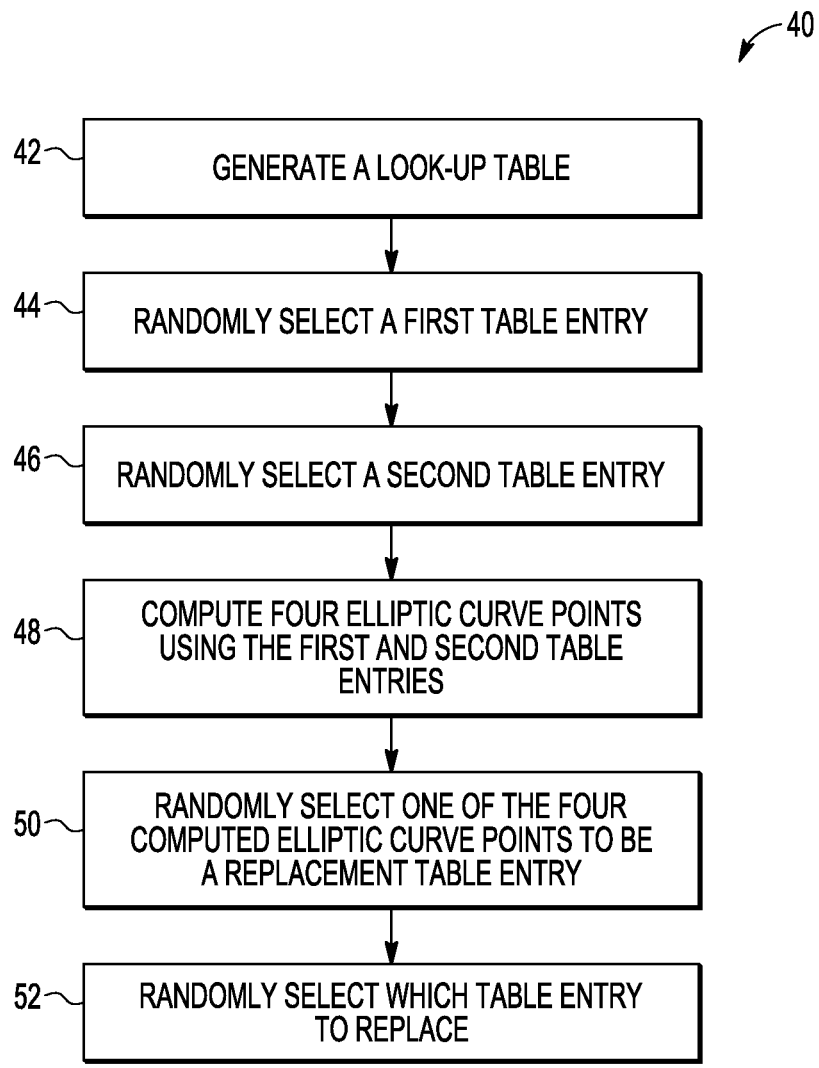
FIG. 3 illustrates a flow chart of a method for performing elliptic curve cryptography in accordance with an embodiment.

FIG. 3 illustrates a flow chart of a method 40 for performing elliptic curve cryptography in accordance with an embodiment. In one embodiment, a digital signature is generated according the ECDSA algorithm. More specifically, method 40 provides an efficient way to perform the calculations required by line 6 of the previously described ECDSA algorithm. At step 42, a look-up table is generated having a plurality of entries. Each entry of the look-up table includes a scalar value and an elliptic curve point as shown in FIG. 2 and discussed above. At step 44, a first table entry of the plurality of table entries is randomly selected. At step 46, a second table entry of the plurality of table entries is randomly selected. At step 48, using the first and second table entries, four intermediate elliptic curve points are computed. The four intermediate values may be:

$$(U_{i[0]} + U_{i[k]})$$

$(U_{i[0]} - U_{i[k]})$ $(-U_{i[0]} + U_{i[k]})$ $(-U_{i[0]} - U_{i[k]})$

In one embodiment, the four points are computed using point addition and point subtraction operations. At step 50, one of the four point is randomly selected to be a new table entry to replace one of the existing entries in look-up table 22. In one embodiment, the random selection is accomplished using a 2-bit counter. At step 52, the existing table entry to be replaced is chosen randomly. In one embodiment, the existing table entry to be replaced is either the first table entry that was randomly selected at step 44, or the second table entry that was randomly selected at step 46. This random selection may be accomplished using a single bit. For example, if the bit is a logic zero, then select the first table entry to replace, and if the bit is a logic one, select the second table entry to replace, or vis versa. In other embodiments, the random selections of method 40 may be accomplished differently.

Figure 4:
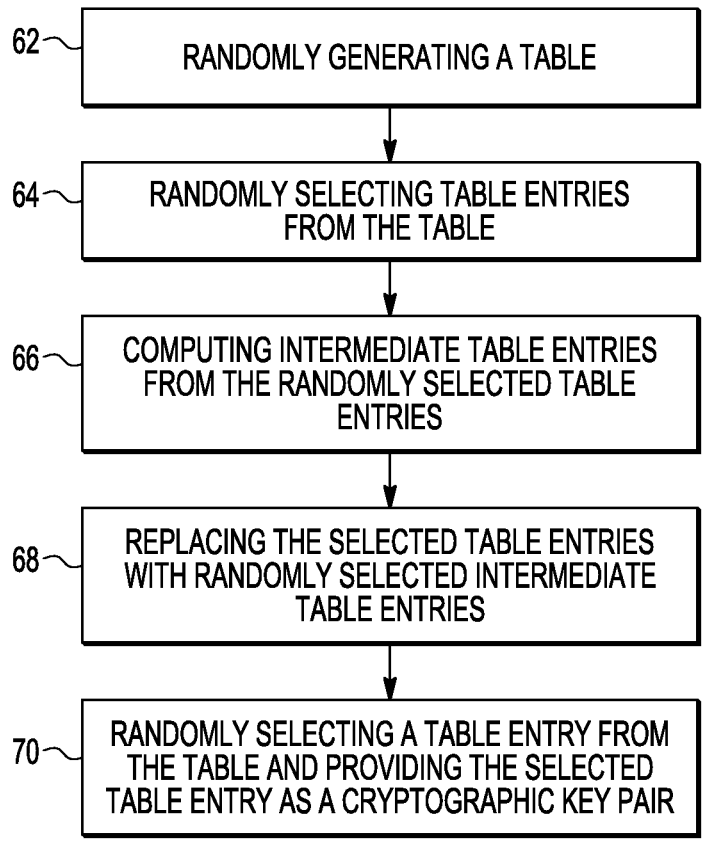
FIG. 4 illustrates a flow chart of a method for generating cryptographic key pairs in public key cryptography in accordance with an embodiment.

FIG. 4 illustrates a flow chart of a method 60 for generating cryptographic key pairs in public key cryptography in accordance with an embodiment. Method 60 may be applied to elliptic curve cryptography, or to another cryptographic technique using a different mathematical principle, such as a mathematical group of integers modulo for a prime number as used in the digital signature algorithm (DSA). Method 60 starts at step 62. At step 62, a table having a plurality of table entries is randomly generated. Each table entry includes a plurality of group elements. An exemplary table may be as illustrated in FIG. 2 and described above. Each group element in a table entry of the plurality of table entries has a discrete logarithm to a corresponding base. The corresponding base may be the same of each table entry. A base of the discrete logarithm may be taken from a list of bases. The list of bases may be the same for each group element of the table entry. At step 64, table entries from the plurality of table entries in the table generated in step 62 are selected. In one embodiment, the latest selections of table entries may be stored, and repeated selection are avoided. In another embodiment, repeating a selection may be allowed. At step 66, using the table entries selected in step 64, intermediate table entries are computed from combinations of the selected table entries. The combinations of selected table entries may be computed using addition and subtraction operations as described above. Each intermediate table entry includes intermediate group elements, where each intermediate group element has a discrete logarithm to a corresponding base. A base of the discrete logarithm may be taken from the list of bases. The list of bases may be the same for each intermediate group element of the intermediate table entry. At step 68, the selected table entries are replaced with randomly selected intermediate table entries, thus changing the table. At step 70 a table entry is randomly selected. The randomly selected table entry is then provided as a cryptographic key pair. The selected table entries may be replaced with the randomly selected intermediate table entries as described for step 68 before are after providing the cryptographic key pair. Steps 64 through 68 are repeated to change the table again. Also, steps 64 through 70 are repeated for additional key pairs. In one embodiment, batches of key pairs may be generated, the batches including many cryptographic key pairs. Additionally, the selected intermediate table entries may be used for providing shared secrets having the same discrete logarithm as the generated cryptographic key pair. In another embodiment, a private key may be provided instead of, or in addition to, the cryptographic key pair. Further, the private key may be inverted for use in, for example, a digital signature scheme. In the case where large batches are generated, the use of simultaneous inversions may provide for more efficient computations.

As noted above, one described embodiment is for elliptic curves. However, one skilled in the art would know that the described technique could be adapted for use in another mathematical group that might be used for cryptographic purposes, such as a group of integers modulo a prime number as used in the digital signature algorithm (DSA). For example, inverse values could be stored together with the computed values to avoid inversions for performance reasons. In some embodiments, depending on the mathematical group that is used, there may be no efficient way to compute the sum and difference at the cost of one addition. In this case, the sum and difference may be computed in two separate operations.

Further, the described technique may be adapted for generating shared secrets. The generation of shared secrets may be achieved by extending the table entries by multiples of a public key (another point on the elliptic curve or group generator) and handling them in the same way as the multiples of the base point G (or group generator), such that they have the same discrete logarithm as the key. In mathematics, a discrete logarithm is an integer k exponent that solves the equation $b^k = g$, where b and g are elements of a finite group, b is called the base, and g is called the value whose logarithm is being taken. In groups that are usually written in additive notation as elliptic curves, the equation above is written as $k*b = g$.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Various embodiments may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating cryptographic key pairs in public key cryptography, the method comprising:
   A hardware Processor;
   randomly generating a table having a plurality of table entries, each table entry comprising a plurality of group elements, each group element in a table entry of the plurality of table entries having a same discrete logarithm to a corresponding base, the corresponding bases of the discrete logarithms being the same for each table entry;
   randomly selecting table entries from the plurality of table entries;
   computing intermediate table entries from combinations of the selected table entries, each intermediate group element in an intermediate table entry having a same discrete logarithm to a corresponding base, and the corresponding bases of the discrete logarithms of the intermediate group elements being the same as for the table entries;
   replacing the selected table entries with randomly selected intermediate table entries to produce an updated table; and
   randomly selecting a table entry of the updated table and providing it as a cryptographic key pair, wherein a batch of cryptographic key pairs are generated, and wherein the updated table is transformed using simultaneous inversions of Z-components for point-coordinate transformations.

2. The method of claim 1, wherein the public key cryptography is implemented using an elliptic curve.

3. The method of claim 2, wherein computing intermediate table entries from combinations of the selected table entries further comprising using addition and subtraction operations for the computation of the intermediate table entries.

4. The method of claim 3, wherein computing intermediate table entries from combinations of the selected table entries further comprising using computations of sums and differences of points in a single operation.

5. The method of claim 1, further comprising providing shared secrets having a same discrete logarithm as the generated cryptographic key pair.

6. The method of claim 1, wherein randomly selecting table entries from the plurality of table entries further comprising storing latest selections of table entries and avoiding repeating the latest selections.

7. The method of claim 1, wherein the method for generating cryptographic key pairs in public key cryptography further comprising:
   randomly selecting table entries from the updated table, computing intermediate table entries from combinations of the selected table entries from the updated table, each intermediate table entry of the updated table comprising intermediate group elements, each intermediate group element in an intermediate table entry having a same discrete logarithm to a corresponding base and the corresponding bases of the discrete logarithms being the same as for the table entries from the updated table; and
   replacing the selected table entries from the updated table with randomly selected intermediate table entries,
   wherein the steps of randomly selecting, computing, and replacing are repeated before providing the key pair.

8. The method of claim 1, further comprising providing a batch of the inverses of the private keys using simultaneous inversions on a batch of private keys.

9. A non-transitory machine-readable medium having instructions for generating cryptographic key pairs in public key cryptography, the non-transitory machine-readable medium comprising:
   instructions for randomly generating a table having a plurality of table entries, each table entry comprising a plurality of group elements, each group element in a table entry of the plurality of table entries having a same discrete logarithm to a corresponding base, the corresponding bases of the discrete logarithms being the same for each table entry;
   instructions for randomly selecting table entries from the plurality of table entries;
   instructions for computing intermediate table entries from combinations of the selected table entries, each intermediate group element in an intermediate table entry having a same discrete logarithm to a corresponding base, and the corresponding bases of the discrete logarithms of the intermediate group elements being the same as for the table entries;
   instructions for replacing the selected table entries with randomly selected intermediate table entries; and
   instructions for randomly selecting a table entry and providing it as a cryptographic key pair, wherein a batch of cryptographic key pairs are generated, and wherein the updated table is transformed using simultaneous inversions of Z-components for point-coordinate transformations.

10. The non-transitory machine-readable medium of claim 9, wherein the public key cryptography is implemented using an elliptic curve.

11. The non-transitory machine-readable medium of claim 10, wherein the instructions for computing intermediate table entries from combinations of the selected table entries further comprising instructions using addition and subtraction operations for the computation of the intermediate table entries.

12. The non-transitory machine-readable medium of claim 11, wherein the instructions for computing intermediate table entries from combinations of the selected table entries further comprising instructions for using computations of sums and differences of points in a single operation.

13. The non-transitory machine-readable medium of claim 9, further comprising instructions for providing shared secrets having a same discrete logarithm as the generated cryptographic key pair.

14. The non-transitory machine-readable medium of claim 9, wherein the instructions for randomly selecting table entries from the plurality of table entries further comprising instructions for storing latest selections of table entries and avoiding repeating the latest selections.

15. The non-transitory machine-readable medium of claim 9, further comprising:
- instructions for randomly selecting table entries from the updated table;
- instructions for computing intermediate table entries from combinations of the selected table entries from the updated table, each intermediate table entry of the updated table comprising intermediate group elements, each intermediate group element in an intermediate table entry having a same discrete logarithm to a corresponding base and the corresponding bases of the discrete logarithms being the same as for the table entries from the updated table; and
- instructions for replacing the selected table entries from the updated table with randomly selected intermediate table entries.

16. The non-transitory machine-readable medium of claim 9, further comprising instructions for providing a hatch of the inverses of the private keys using simultaneous inversions on a batch of private keys.

* * * * *